United States Patent [19]

Williams

[11] 4,095,549
[45] Jun. 20, 1978

[54] HIGH PERFORMANCE WATER VEHICLE

[76] Inventor: Arthur L. Williams, 11301 Yolanda Ave., Northridge, Calif. 91326

[21] Appl. No.: 777,169

[22] Filed: Mar. 14, 1977

[51] Int. Cl.² .............................................. B63B 1/20
[52] U.S. Cl. .................................. 114/283; 114/123; 114/273
[58] Field of Search ...................... 114/39, 43, 61, 123, 114/126, 271, 272, 273, 283, 284; 115/70; D12/5, 62, 64; 244/105, 106

[56] References Cited

U.S. PATENT DOCUMENTS

| D. 229,105 | 11/1973 | Miller | D12/64 |
|---|---|---|---|
| 1,846,602 | 2/1932 | Lake | 114/283 |
| 2,347,959 | 5/1944 | Moore et al. | 114/283 |
| 2,996,030 | 8/1961 | Lornson | 114/283 |
| 3,112,725 | 12/1963 | Malrose | 114/39 |
| 3,288,096 | 11/1966 | Swenson | 114/273 |
| 3,954,077 | 5/1976 | Piat-Marchand | 114/123 |

FOREIGN PATENT DOCUMENTS 1,294,727   4/1962   France ................................ 114/272

Primary Examiner—Trygve M. Blix
Assistant Examiner—Stuart M. Goldstein

[57] ABSTRACT

A high performance marine vehicle capable of attaining record-breaking velocities is disclosed herein having an elongated hull supporting aft mounted and outwardly extending wing members from which side ski-floats downwardly depend. A frontal ski-float is carried at the bow of the vehicle hull. All three of the ski-floats incorporate an almost triangular aft platform on which the vehicle is supported in a high speed planing mode of operation. Horizontal chine strips are affixed from bow to stern along the opposite sides of the hull. Horizontal chine strips are also affixed to the aft portion of the three-ski-floats. Aerodynamic and hydrodynamic steering and stability are employed by the vehicle as well as a rocket propulsion system. The mass of the vehicle is distributed so that the center of gravity is well forward of the vehicle's center of lift to assure longitudinal stability and prevent a pitching divergence.

17 Claims, 12 Drawing Figures

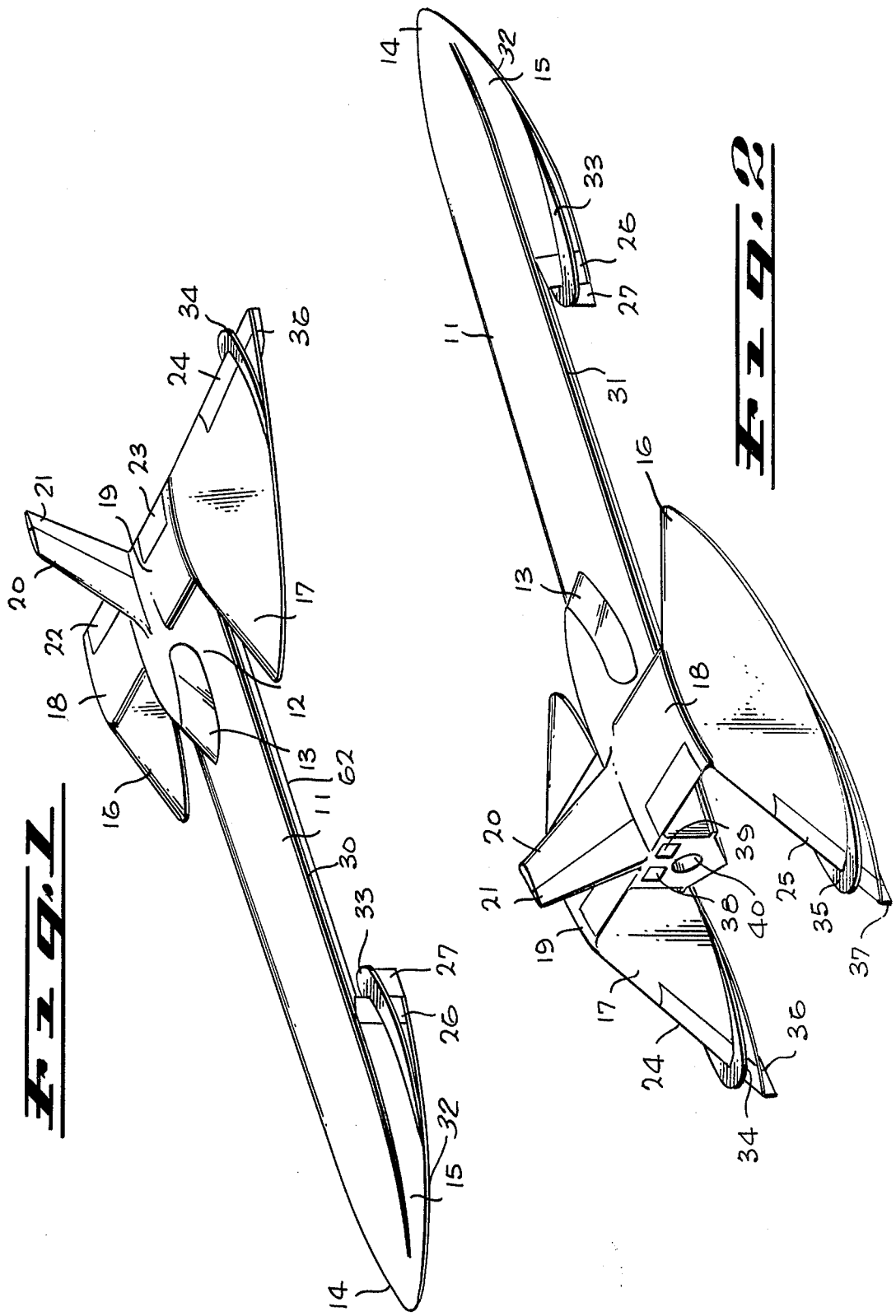

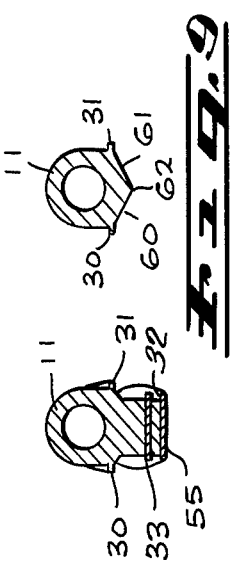
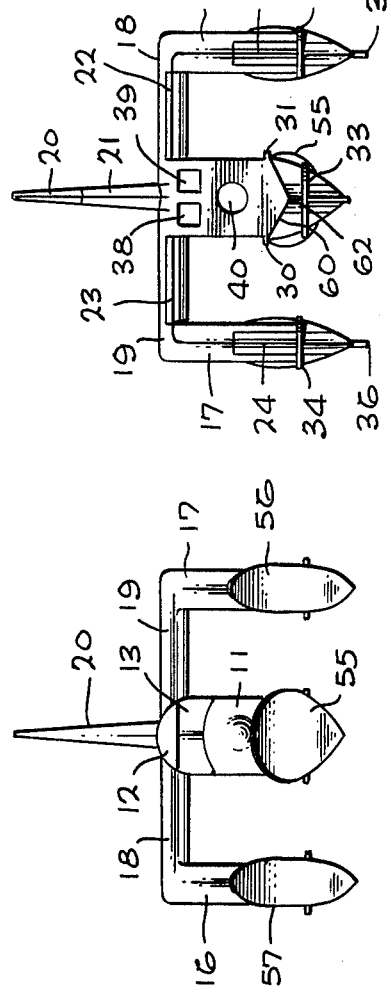
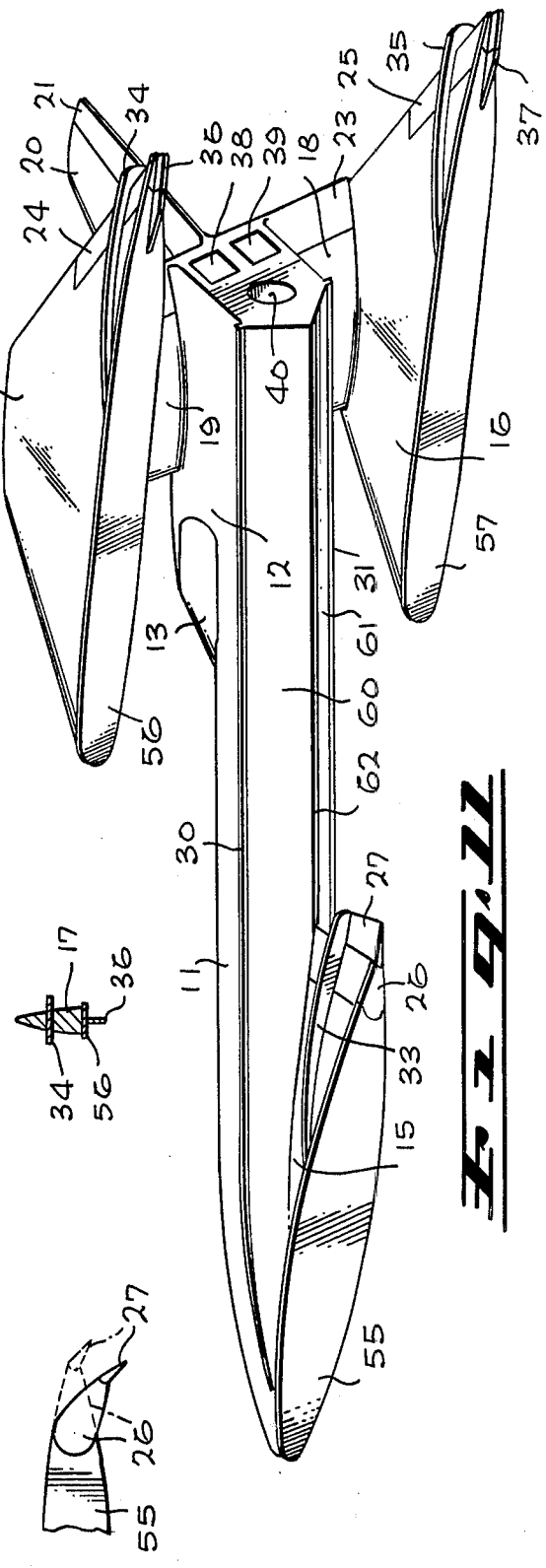

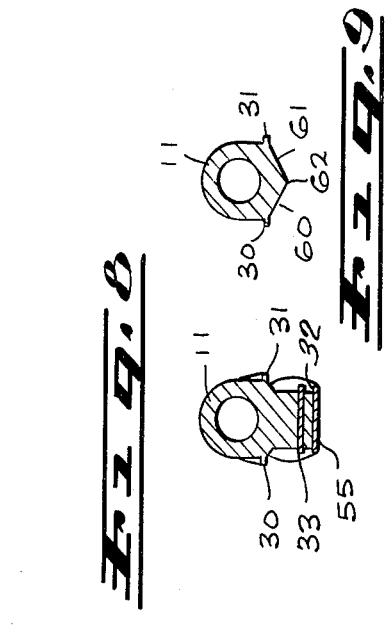
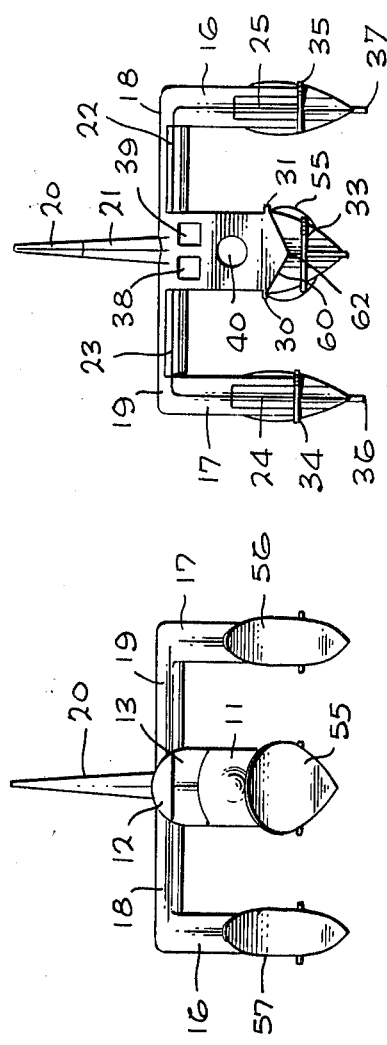
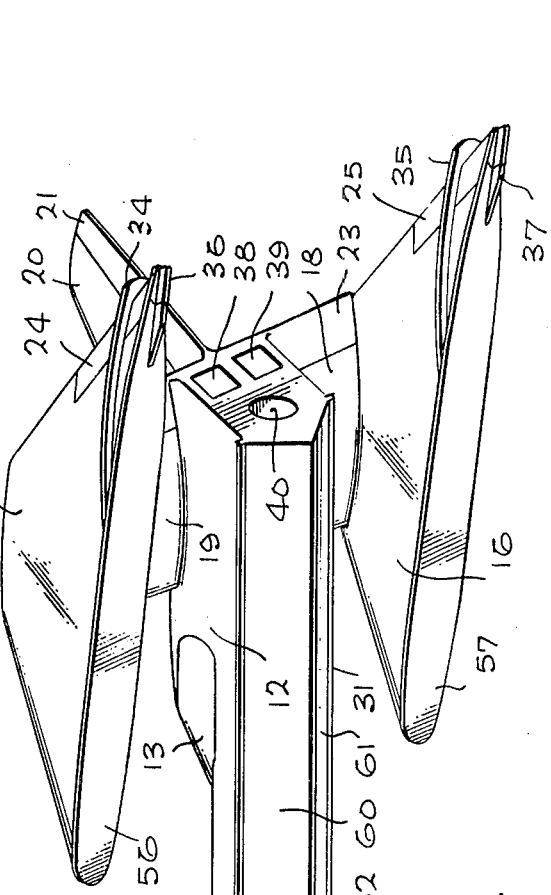
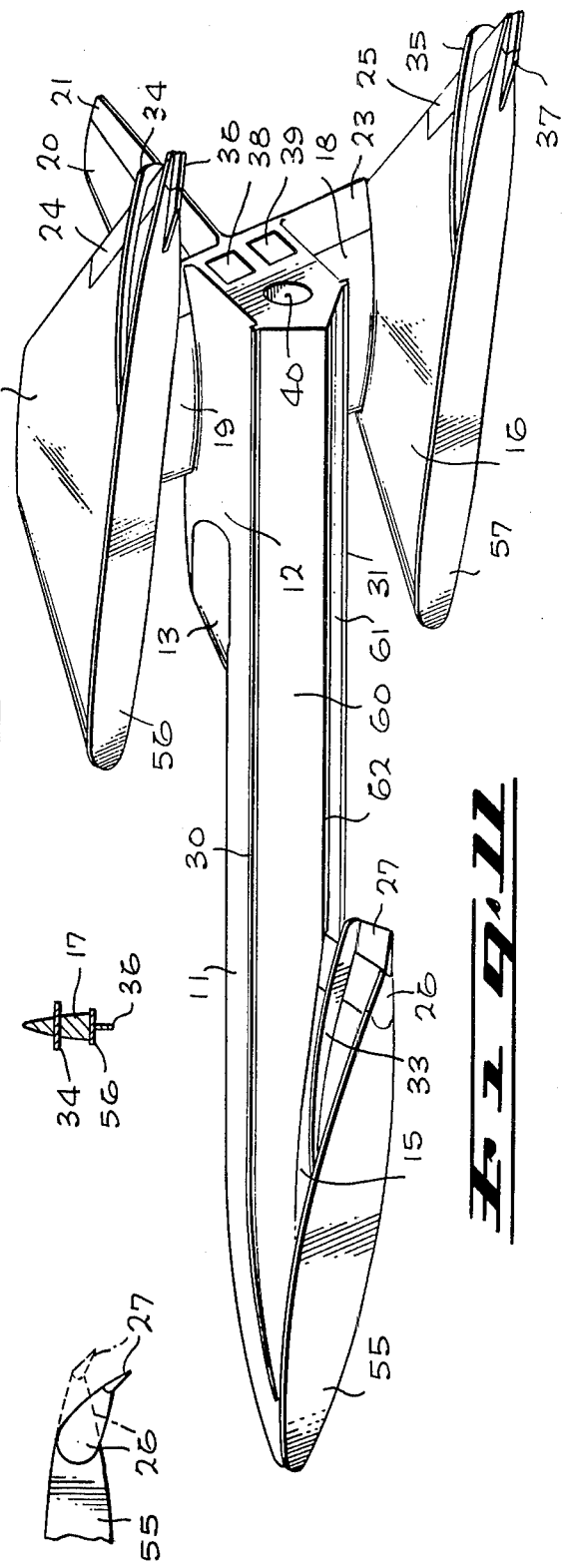

HIGH PERFORMANCE WATER VEHICLE

BACKGROUND OF THE INVENTION

1. Field of the Invention

This invention relates to the field of high performance marine vehicles of the speed record-breaking class and more particularly to a novel marine vehicle having three-point suspension employing hydroskis, floats, aerodynamic and hydrodynamic steering and water splash and spray control chines.

2. Brief Description of the Prior Art

Hydroski vehicles are designed and constructed to operate in various planing modes such as a low speed mode wherein the vehicle is supported in the water by its basic hull, a high speed mode wherein the vehicle is supported on the water by a pair of skis, and a transition mode wherein the vehicle may be supported in various degrees by both the basic hull and the hydroskis.

It is customary to provide a primary power plant for propelling the vehicle in these modes of operation. The power plant is generally mounted in the basic hull for operating a propulsion unit which is either carried on the ski per se or which is carried on the basic hull and selectively submerged in the water during the low speed mode of operation while having a separate power plant and propelling unit for the high speed mode of operation. The primary power plant is coupled to the propelling unit by means of a drive shaft of relatively long length so that the propelling unit may be kept in the water during the transition and high speed modes. This is especially true in the high speed mode since the basic hull is removed from the water and the power plant is therefore located further away from the propelling unit than during low speed operation. Such a conventional water craft is disclosed in U.S. Pat. No. 3,952,678.

The present day high speed marine vehicles such as racing speedboats have generally taken the form of conventional hydroplane boats or vehicles and have been powered by either a water-screw turned by a propeller shaft from a stationary power plant or have been powered by a jet engine. Although these boats have been successful in setting new speed records in the high speed regime, problems have been encountered which have set limits to the uppermost speed. At these higher speeds, the air loads begin to have a much greater influence over the pitching stability of the marine vehicle. Many record breaking attempts have been aborted or failed because of the lack of pitching stability of the water vehicle. Usually, the bow of the boat rises out of the water because of the high lifting force on the front end of the hull or forward of the center of gravity.

Furthermore, conventional high speed or high performance water craft lack in directional stability so that a straight and true course cannot be readily attained. The directional stability of conventional craft is also influenced by impingement of spray and water striking the hull or other surfaces of the water craft at high speeds.

Therefore, a long standing need is present to provide a novel high performance water vehicle having greater directional stability and pitching stability than heretofore obtainable.

SUMMARY OF THE INVENTION

Accordingly, the above problems and difficulties are obviated by the present invention which provides a novel high performance marine vehicle having an elongated hull or body which is supported on a three-point suspension arrangement comprising a frontal ski-float and a pair of aft side ski-floats. Each of the ski-floats and the frontal float include hydroski surfaces which are angularly disposed with respect to the surface of the water so that as vehicle speed increases, the vehicle will gradually climb upwardly until the vehicle is supported on a reduced wetted area constituting the trailing nearly triangular platform or surface of the hydroskis. Means are provided on the side ski-floats and the hull which extend outwardly for a short distance and which are adapted for controlling spray and water streams normally impinging against and attaching to the sides of the ski-floats and the hull thereof. Hydrodynamic and aerodynamic steering means are provided and are operably disposed on the hull and the side ski-floats as well as the frontal ski-float so that the vehicle operator has directional control of the vehicle. Fixed means are further provided on the reduced wetted area on the aft end of the hydroskis for inducing directional stability to the vehicle during its high speed mode of operation.

Therefore, it is among the primary objects of the present invention to provide a novel marine vehicle incorporating a three-point suspension or fixed hydroski arrangement which provides hydrodynamic lift at cruising speeds and at maximum speed wherein the remainder of the hull resides above the surface of the water.

Another object of the present invention is to provide a novel hydroski vehicle wherein the basic hull provides vehicle support for static displacement at rest and in a low speed mode of operation and a portion of the planing surface during the transitional mode from low speed to high speed. The aft ski-floats provide lateral stability of the vehicle in all the above mentioned modes of operation.

Another object of the present invention is to provide a novel three-point hydroski marine vehicle employing narrow-beam skis providing substantially reduced wetted area at the high speed mode of operation or planing and incorporating directional stability means at the trailing edge of each hydroski during the high speed mode of operation.

Still a further object of the present invention is to provide a novel hydroski water vehicle having improved directional control and stability and pitch stability whereby record breaking speeds are obtainable.

Still a further object of the present invention is to provide a novel marine vehicle having improved directional control and stability as well as longitudinal stability incorporating both fixed and dynamic means therefore.

A further object resides in the provision of maintaining the mass well forward of the vehicle's center of lift to assure longitudinal stability and prevent a pitching divergence.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a front perspective view showing the novel high performance and high speed marine vehicle of the present invention;

FIG. 2 is a rear perspective view thereof;

FIG. 3 is a side elevational view of the novel marine vehicle shown in FIGS. 1 and 2 and illustrating many of the internal components thereof in broken lines;

FIG. 4 is a top plan view of the marine vehicle illustrated in FIG. 3;

FIG. 5 is a bottom plan view of the vehicle shown in FIGS. 3 and 4 illustrating the bottom surface of the three-point suspension hydroskis;

FIG. 6 is a front elevational view of the marine vehicle showing the parallel angular deposition of the hydroskis;

FIG. 7 is a rear elevational view of the marine vehicle;

FIG. 8 is a transverse cross-sectional view of the marine vehicle shown in FIG. 3 as taken in the direction of arrows 8—8 thereof;

FIG. 9 is a transverse cross-sectional view of the marine vehicle taken in the direction of arrows 9—9 of FIG. 3 and is forward of the center of gravity with full load aboard in the vehicle;

FIG. 10 is a transverse cross-sectional view of the rear end of the aft ski-floats as taken in the direction of arrows 10—10 of FIG. 3;

FIG. 11 is a rear perspective view of the marine vehicle illustrating the underside of the hydroskis and the underside of the hull; and FIG. 12 is an enlarged bottom view of the aft end of the front ski-float showing the dynamic directional control and steering thereof.

DESCRIPTION OF THE PREFERRED EMBODIMENT

Referring to FIG. 1, a marine vehicle embodying the present invention is shown and the embodiment selected for illustration is a high performance marine vehicle capable of performing as a competitive craft in high speed, record-breaking events. The vehicle includes an elongated hull 11, the construction of which includes a cockpit area 12 located at the stern of the vehicle and the cockpit includes a windshield construction 13 for the protection of the operator or driver. The starboard and port sides of the hull progress forward toward a bow 14 where they converge to join at a stem or prow. Hull configuration of low hydrodynamic and aerodynamic drag is thus defined.

The bow of the vehicle is provided with a front float 15 which downwardly depends therefrom and a pair of side ski-floats 16 and 17 which are outwardly supported from the stern of the vehicle by means of wing-like structures 18 and 19. The front ski-float 15 and the side ski-floats 16 and 17 provide a three-point suspension arrangement for floatably supporting the marine vehicle in the water. The wing-like supports 18 and 19 support the side ski-floats 16 and 17 in a cantilevered manner so that the ski-floats downwardly depend from the terminating end of the wing-like structure. The wing-like structure 18 and 19 are elevated from the surface of the water and at no time submerge in water and are arranged to outwardly project from the uppermost part of the hull 11 where the hull is raised to define the cockpit 12.

Directional stability for the craft or vehicle is obtained aerodynamically by means of a vertical stabilizer 20 supporting an air steering rudder 21. Further aerodynamic control or stabilization is achieved by means of elevators 22 and 23 carried along the trailing edge marginal region of the wing-like structures 18 and 19 respectively. Augmenting the air steering rudder 21 are a pair of air and water steering rudders 24 and 25, seen more clearly in FIG. 2, while additional dynamic steering is provided via a forward steering rudder 26 having a tab rudder 27 pivotally carried thereon.

To obtain very high speeds water craft must raise most of their wetted surface out of the water and plane on the very small part that remains in the water. Many methods have been employed to overcome the large downward hydrodynamic force or suction that occurs when water is passed at high speeds over the lower surface of a water craft. Some hulls or floats use steps in the bottom to break loose the attached flow and reduce the downward suction. Some use air tunnels extending down the hull bottom and some use hydrofoils.

For increased control and stability, the vehicle is further provided with chine means for controlling water spray and splash during operation of the vehicle's progress and release from the water from a stationary mode through a transition mode of operation to its ultimate high speed planing mode. Port and starboard chine means, taking the form of strips 30 and 31, extend forward from the stern of hull 11 to the bow 14 on opposite sides of the hull. The port and starboard chine strips are located on the same plane immediately below the central horizontal axis or plane of the hull 11. A front ski-float chine strip 32 is provided which extends from the forward part of the front float rearwardly on opposite sides of the front ski-float to terminate in a common flange 33 immediately above the rudder trim tab 27. Each of the side ski-floats 16 and 17 include a similar chine strip arrangement as indicated by numerals 34 and 35 respectively associated with floats 17 and 16 respectively.

As shown more clearly in FIG. 2, additional directional stability is obtained by the provision of skags 36 and 37 carried at the extreme end of the ski-floats 17 and 16 respectively. Such skags provide the directional stability at maximum planing or high speed mode of operation. A pair of drogue chute compartments 38 and 39 are provided for storing and deploying drogue chutes during braking of the vehicle after a high speed performance run. The stern or aft end of the hull 11 also is configured with an opening or aperture 40 constituting an exhaust nozzle for the power propulsion plant carried in the hull. For high speed operation, it is contemplated that jet thrust or rocket thrust be employed for propelling the marine vehicle.

Referring now in detail to FIG. 3, it can be seen that the hull 11 houses a rocket engine 40 in the stern or aft end of the hull and that fuel tanks 41, 42 and 43 are arranged ahead of the rocket engine. The rocket engine shown is of the hydrogen peroxide type and requires a pressure tank 44. It is to be particularly noted that the average center of gravity is indicated by point 45 and that when the fuel tanks are fully loaded and the vehicle is in its stationary or at rest position or mode, the center of gravity moves forward to the point indicated by numeral 46. As the engine is fired and the fuel is consumed during the transitional mode of operation as well as the high speed mode, the center of gravity may move to point 47 which is the aft center of gravity. But at no time has the center of gravity traveled behind aerodynamic center or center of lift of the total vehicle.

Hydraulic and electrical systems are located in compartments 50 and 51 while batteries are indicated by numeral 52. The bow may contain a ballast or payload compartment 53 which helps to manage the center of gravity which augments the longitudinal stability of the vehicle by assisting to maintain the bow down during the transition to the planing and high speed mode of operation.

A feature of the present water craft's invention is its ability to carry much of the aforementioned mass well forward in its very narrow hull, which because of its shape does not induce much lift or aerodynamic side force as compared to the large lift and side forces which can be generated by the aft wing, vertical stabilizer and ski-floats. This enables the aerodynamic center or center of lift to stay substantially behind the center of mass.

To assure that the center of gravity stays within its aft limit, a fuel management system is used to meter the fuel from the proper tank in the most advantageous manner.

The rocket engine 40 is capable of generating thrust approximately two to five times the weight of the water vehicle. Although a rocket engine is contemplated, it is to be understood that other jet thrust engines and power plants may be employed.

FIG. 3 further illustrates that the frontal ski-float 15 as well as the side ski-floats 16 and 17 include rearwardly sloping skis 55, 56 and 57. Each of the skis are substantially flat but may be formed with a moderate Vee shaped bottom and rearwardly slope from a terminating forward position to a lower aft position. The skis are provided, therefore, with a moderate angle of attack of less than 16 degrees and include almost triangular planing surfaces or platforms having similar angles of closure at the rear end portions of the ski-floats. It is on these triangular portions or platforms that the vehicle travels at high speeds across the water in its planing mode. While in this mode of operation, it is noted that the spray from the triangular portion of the ski at the extreme rear end thereof will have a negligible effect on the directional stability of the craft. It will to no appreciable extent impinge on the underside of the wing structures 18 and 19 since during the high speed mode of operation, the aft triangular portions of the skis 56 and 57 are well aft of the hull 11 and wing structures 18 and 19.

FIGS. 4 and 5 further illustrate the outwardly projection of the chine strips 30 and 31 along the sides of the hull 11 as well as the chine strips 34 and 35 associated with the side ski-floats. By these means, spray and water particles impinging against the sides of the craft are controlled so as to eliminate problems of hull release from the water and problems of maintaining water from attacking to the wing structures. Also, it can be seen that each of the skis 55, 56 and 57 are slightly larger in width than the mounting area on the respective frontal float and side ski-float. Such an arrangement insures that an adequate surface is provided for supporting the vehicle in all modes of operation and serves as another chine strip for reducing the amount of water that attaches to the side of the ski-floats.

In FIG. 6, the angle of incidence is shown in plan view of the respective skis carried by the opposite side ski-floats and the frontal ski-float. The position and location of the chine strips is also evident so as to prevent water impingement and spray from adversely effecting steering or stability of the craft.

In FIG. 7, the chine strips are further illustrated as well as the location of the skags 36 and 37.

Referring now to FIGS. 8, 9 and 10, a variety of cross sections are illustrated which are taken in the direction of the respective arrows shown in FIG. 3.

Referring now in detail to FIG. 11, the underside of the marine vehicle 10 is illustrated wherein it can be seen that the underside of hull 11 is V shaped so that sloping bottom portions 60 and 61 come together in a keel line 62. Furthermore, the skags 36 and 37 associated with each of the skis 56 and 57 are more clearly illustrated. It is to be particularly noted that the steering associated with frontal float 15 may be actuated so as to steer the boat by either the trim tab 27 per se or in combination with the forward steering rudder 26. As shown in FIG. 12, only the trim tab 27 is deployed for fine steering control in the high speed very sensitive mode as shown in broken lines. However, for more pronounced frontal steering at slower speeds, the rudder 26 is pivoted upon its mounting and the tab 27 follows the pivotal movement. It is also within the inventive concept to pivot the tab 27 with or without pivoting movement of rudder 26.

In view of the foregoing, it can be seen that the marine vehicle provides a high performance marine vehicle that has exceptional longitudinal or pitching stability since at very high speeds the overall center of lift for the total boat is behind the center of gravity at all times. In addition, the directional stability is exceptional because the center of sidewise force on the total craft is well behind the center of gravity for the craft. Not only do the aerodynamic forces not destabilize the boat at the higher speed, but means are provided in the form of skags at the back end of the two aft ski-floats which give desirable hydrodynamic directional stability. The skags along with the air rudder and the overall vertical area of the ski float or sponsons contribute fairings to make the vehicle run true. The horizontal stabilizer or aft wings which support the side ski-floats also act as fairings to make the vehicle run true in pitch. The size of the vertical stabilizer may be diminished as the directional stability is found adequate in some conditions. This area may even be diminished to zero.

Marine vehicle ski-floats at rest in the water with almost half of the lower portion of its hull 11 submerged. As the craft moves forward, the three ski-floats 15, 16 and 17 begin to support the boat with the water line moving down and aft on each ski with increasing speed until only the aft most triangular planing area of the three skis 55, 56 and 57 is supporting the total weight of the craft.

The water resistance or drag from the skis become less as a smaller and smaller wetted or scrubbing area is drawn through the water. The aerodynamic drag from the air moving over the boat becomes greater with increase in speed. The boat or craft may continue to accelerate until the resistance of the water on the three skis and two skags 36 and 37 plus the aerodynamic drag of the craft equals the thrust of the jet or rocket.

The wing-like structure 18 and 19 never rests in the water while the boat is at rest. It does not necessarily supply lift while rapidly moving through the air. The purpose of the wing-like structure is mainly to support the side ski-floats and secondly, to provide aerodynamic stability and trim ability by being well aft of the center of gravity of the hull or vehicle. The surfaces at the aft end identified by numerals 22 and 23 can be controlled by the pilot independently or together to retrim the aerodynamic loads of the craft. This does not necessarily mean that the control surfaces are used to provide lift on the wing-like structure to support the boat.

Directional steering of the marine vehicle is accomplished in several ways. All of the devices which steer the craft are controlled by a driver or pilot positioned in the cockpit compartment 12 in the main portion of the hull 11. The driver operates steering controls and various levers (not shown). The aft end of the frontal float 15 moves left and right as the driver turns the steering mechanism altering the rudders 26 and/or the trim tab 27. The aft end of the side ski-floats can also move left and right and is controlled by the driver via the air steering rudder 21 and the water steering rudders 24 and 25. The aft end of the skags 36 and 37 also move left and right at the driver's command. The vertical tail employs air rudder 21 in the rear portion which moves left and right when the pilot commands the other steering devices. The air rudder in the vertical tail along with the top portion of the rudders in the aft end of the side ski-float deflect the air stream at high speeds and supply a turning load which aids in directionally steering the craft. The aft end of the three ski-floats along with the skags on the side ski-floats deflect the water left and right at high speed and supply turning forces which help steer the water craft at the highest of speeds. These steering forces may be very large and therefore the pilot is supplied with sensitive steering mechanisms. The upper portion of the rudder on the three ski-floats 15, 16 and 17 deflect water left or right when displaced as the boat is moving slowly and has not lifted into its full planing position or mode of operation. These upper rudders act as water rudders and will aid in steering at relatively low speeds.

The craft employs the use of chine strips along the full length of the hull on the opposite sides thereof as represented by numerals 30 and 31 at the upper edge of the "V" bottom. The chine strips are used at the outer edge of the lower flat surface of the three ski-floats and this chine strip is effective at reducing the flow of water to be attached to the side of the hull or ski-float. Conventionally, that water when attached to the side surfaces of the hull or the ski-float causes unnecessarily high loads and make the boat require extreme engine thrust to lift the boat during the transitional mode of operation to the full planing mode of operation. The chine strips not only are found useful to keep the water from remaining attached to the adjacent surfaces of the craft, but also these strips make sure the water will separate from the surface at a specified location; otherwise, water would flow up one side to a greater distance than the other side and provide a random and unsymmetrical load on the aft end of the ski-floats. This, in turn, causes the craft to take abrupt and random turns. Chine strips are also provided horizontally just above the aft end of each ski-float as indicated by numerals 34 and 35. These chine strips turn the upward flow of water off the ski bottoms and deflects the water sideways off each side of the chine at the same place. This assures a symmetrical loading on each side of the ski-float and greatly reduces the directional sensitivity and eliminates the possibility of random turns.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A high performance marine vehicle comprising the combination of:
   a central elongated body extending substantially the full length of said vehicle;
   said marine vehicle having a distributed mass so that the center of gravity is well forward of said vehicle's aerodynamic center of lift;
   a frontal float carried on said body at the bow of said marine body and a pair of side floats separated by the aft end of said marine vehicle;
   a wing-like structure cantilevered outwardly from an upper stern portion of said body in spatial relationship to the surface of said water and said side floats downwardly depending from the terminating ends of said wing-like structure;
   hydroski surfaces carried on the underside of each of said floats and being angularly disposed with respect to the surface of the water so that as vehicle speed increases, said marine vehicle will gradually climb upwardly;
   aft rearwardly tapering planing surfaces on each of said hydroski surfaces constituting a reduced wetted area for supporting said marine vehicle at maximum speed and said rearwardly tapered planing surfaces being well aft of the stern of said body;
   propulsion means operably carried in said body for powering said marine vehicle at high speed;
   aerodynamic and hydrodynamic directional control means operably carried on said body and floats respectively; and
   wherein said aerodynamic directional control means includes a vertical stabilizer upwardly projecting from the stern of said body and having a movable rudder thereon and further including said wing-like structures serving as horizontal stabilizers having movable control surfaces thereon.

2. The invention as defined in claim 1 wherein said frontal and side float means include chine means extending substantially horizontal and longitudinally along the opposite sides thereof for substantially detaching the water flow clinging to the sides of said hull and said float means.

3. The invention as defined in claim 1 wherein said hydrodynamic directional control means includes a pivotal rudder operably carried on the aft end of said frontal float.

4. The invention as defined in claim 3 wherein said hydrodynamic directional control means further includes a steering tab operably carried on the end of said pivotal rudder.

5. The invention as defined in claim 1 wherein said hull is provided with a transverse cross section having a water engaging V-shaped bottom for substantially supporting said marine vehicle in the water in its at rest position or mode.

6. The invention as defined in claim 1 wherein said hull includes chine means extending longitudinally along opposite sides thereof.

7. The invention as defined in claim 1 wherein said hydrodynamic directional control means includes a downwardly depending skag on each of said planing surfaces for inducing directional stability to said marine vehicle during its high speed mode of operation.

8. The invention as defined in claim 1 wherein said hydrodynamic direction control means includes a rudder means movably carried on the rear of said frontal float.

9. The invention as defined in claim 1 including means fixed to opposite sides of said body and to opposite sides of said floats for assisting separation between said body and the water and for reducing attachment of water to the sides of said body and said floats.

10. The invention as defined in claim 9 wherein said separation means includes elongated strips carried along the opposite sides of said body and said floats for interfering with the impingement of water thereagainst and collection thereon.

11. The invention as defined in claim 1 wherein said propulsion means is of the jet thrust type and a substantial amount of said mass is comprised of fuel for said propulsion means;
at least one tank forward of said center of gravity for holding said fuel constituting said substantial amount of said mass.

12. The invention as defined in claim 1 wherein said reduced wetted area of said hydroski surfaces terminate in pointed aft ends.

13. The invention as defined in claim 1 wherein each hydroski surface includes an edge marginal region outwardly projecting beyond the sides of their respective supporting floats.

14. A high performance marine vehicle comprising the combination of:
a central elongated body extending substantially the full length of said vehicle;
said marine vehicle having a distributed mass so that the center of gravity is well forward of said vehicle's aerodynamic center of lift;
a frontal float carried on said body at the bow of said marine body and a pair of side floats separated by the aft end of said marine vehicle;
a wing-like structure cantilevered outwardly from an upper stern portion of said body in spatial relationship to the surface of said water and said side floats downwardly depending from the terminating ends of said wing-like structure;
hydroski surfaces carried on the underside of each of said floats and being angularly disposed with respect to the surface of the water so that as vehicle speed increases, said marine vehicle will gradually climb upwardly;
aft rearwardly tapering planing surfaces on each of said hydroski surfaces constituting a reduced wetted area for supporting said marine vehicle at maximum speed and said rearwardly tapered planing surfaces being well aft of the stern of said body;
propulsion means operably carried in said body for powering said marine vehicle at high speed;
said propulsion means is of the jet thrust type and a substantial amount of said mass is comprised of fuel for said propulsion means; and
at least one tank forward of said center of gravity for holding said fuel constituting said substantial amount of said mass.

15. The invention as defined in claim 14 including aerodynamic and hydrodynamic directional control means operably carried on said body and said floats respectively.

16. The invention as defined in claim 14 wherein said aerodynamic directional control means includes a vertical stabilizer upwardly projecting from the stern of said body and having a movable rudder thereon and further including said wing-like structures serving as horizontal stabilizers having movable control surfaces thereon.

17. In a high performance marine vehicle, the combination comprising:
an elongated hull;
frontal float means carried on the forward end of said hull;
side float means carried on the aft end of said hull;
connecting structure securing said side float means to said hull in fixed spaced apart relationship
ski means carried on the underside of each of said frontal and side float means constituting a three-point suspension supporting said marine vehicle in its transitory and high speed planing modes of operation;
said ski means having approximately the same angle of incidence and including planing surfaces on each of said ski means;
hydrodynamic directional control means operably carried on said front and side float means for providing directional steering and stabilization;
aerodynamic directional control means operably carried on said hull and said connecting structure for providing aerodynamic directional steering and stabilization;
propulsion means operably carried on said hull of the jet thrust type and a substantial amount of mass is comprised of fuel for said propulsion means; and
at least one tank forward of said center of gravity for holding said fuel constituting said substantial amount of said mass.

* * * * *